US012783959B2

(12) United States Patent
Bose et al.

(10) Patent No.: US 12,783,959 B2
(45) Date of Patent: Nov. 3, 2026

(54) METHOD AND SYSTEM TO ESTIMATE MODEL PERFORMANCE WITHOUT GROUND TRUTH BASED ON MODEL DECISION BOUNDARIES

(71) Applicant: Tata Consultancy Services Limited, Mumbai (IN)

(72) Inventors: Nirban Bose, Bangalore (IN); Jayashree Arunkumar, Chennai (IN); Amit Kalele, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 476 days.

(21) Appl. No.: 18/503,859

(22) Filed: Nov. 7, 2023

(65) Prior Publication Data

US 2024/0220798 A1 Jul. 4, 2024

(30) Foreign Application Priority Data

Dec. 23, 2022 (IN) ............................ 202221074994

(51) Int. Cl.
*G06N 20/00* (2019.01)
*G06F 18/23* (2023.01)
*G06N 7/01* (2023.01)

(52) U.S. Cl.
CPC ............. *G06N 20/00* (2019.01); *G06F 18/23* (2023.01); *G06N 7/01* (2023.01)

(58) Field of Classification Search
CPC ........ G06N 20/00; G06N 20/10; G06N 20/20; G06F 18/23
See application file for complete search history.

(56) References Cited

U.S. PATENT DOCUMENTS

2017/0193078 A1 7/2017 Limonad et al.
2019/0163806 A1* 5/2019 Bauer .................. G06F 16/285
(Continued)

FOREIGN PATENT DOCUMENTS

WO WO2020185101 A1 9/2020

OTHER PUBLICATIONS

Hu, Qiang et al., "Efficient Testing of Deep Neural Networks via Decision Boundary Analysis", Date: 2022, Publisher: arxiv, Link: https://arxiv.org/abs/2207.10942.

*Primary Examiner* — Eric Nilsson
(74) *Attorney, Agent, or Firm* — Finnegan, Henderson, Farabow, Garrett & Dunner, LLP

(57) ABSTRACT

This disclosure relates to method and system to estimate model performance based on model decision boundaries. Absence of ground truths in a production scenario makes difficult to estimate the model behavior and performance. The disclosed method receives a set of unlabeled datapoints as input and a set of features are extracted from a training dataset associated with a model for which the performance is being estimated. Further, a nearest neighbor point of each unlabeled datapoint is computed from the training dataset with a first distance and a second distance and an associated ground truth. The performance of the model is estimated by evaluating a label assigned to each unlabeled datapoint from the set of unlabeled datapoints. Then, a decision boundary radius of the model is computed for the nearest neighbor point of each unlabeled datapoint based on the training dataset and the tolerance value using a Bayesian optimization technique.

5 Claims, 7 Drawing Sheets

(56) References Cited

U.S. PATENT DOCUMENTS

| | | | | |
|---|---|---|---|---|
| 2020/0265270 | A1* | 8/2020 | Boudreau | G06N 20/00 |
| 2020/0387760 | A1 | 12/2020 | Kamdar et al. | |

* cited by examiner

METHOD AND SYSTEM TO ESTIMATE MODEL PERFORMANCE WITHOUT GROUND TRUTH BASED ON MODEL DECISION BOUNDARIES

PRIORITY CLAIM

This U.S. patent application claims priority under 35 U.S.C. § 119 to: Indian Patent Application No. 202221074994, filed on Dec. 23, 2022. The entire contents of the aforementioned application are incorporated herein by reference.

TECHNICAL FIELD

The disclosure herein generally relates to performance estimation, and, more particularly, to method and system to estimate model performance without ground truth based on model decision boundaries.

BACKGROUND

Recently, artificial intelligence AI-based solutions such as machine learning models and deep learning models have improved the performance but the challenge of absence of ground truths still persists. This makes it difficult to estimate the model behavior and model performance, which further adds to lack of transparency in such models and poses issues in their acceptance. This, in turn, effects the various stake holders including business users, domain experts and data scientists. The decisions made by the AI model in unlabeled datapoints is critical for real life scenarios. The most challenging factor is the absence of ground truths in unlabeled datapoints which prohibits any reference for comparison with the model predictions.

Conventional approaches for developing ground truth use an annotator component to identify entities and entity relationships according to a statistical model that is based on ground truth. However, there are several methods and software libraries prevalent in industry today that permit users to compute various kind of data drift on different data types. Drift computation is not sufficient to raise the alert for model retraining. In an unlabeled datapoints scenario, the ground truths for the data (correct labels in case of classification and regression values for regression problems) are not available. Typically, such scenario requires either manual effort in getting the ground truths for the data or in case of time series data, ground truths may be available with delay. The model performance can be further computed based on the availability of ground truths. This exposes substantial risk that model performance might be degraded but can only be detected post manual intervention. However, due to the diversified scenarios and subjective nature of explanations, the ground truth for benchmark evaluation in model estimation pose challenge in estimating the model performance.

SUMMARY

Embodiments of the present disclosure present technological improvements as solutions to one or more of the above-mentioned technical problems recognized by the inventors in conventional systems. For example, in one embodiment, a system for estimating model performance based on model decision boundaries is provided. The system includes receiving a set of unlabeled datapoints as input and the set of unlabeled datapoints are provided into a model among a set of models to extract a set of features from a training dataset associated with the model. The performance of the model is estimated by evaluating a label assigned to each unlabeled datapoint from the set of unlabeled datapoints based on computing a nearest neighbor point of each unlabeled datapoint from the training dataset with a first distance and a second distance and an associated ground truth. The assignment of the label is performed if the location of each unlabeled datapoint lies within a decision boundary of the model around the nearest neighbor point.

In one embodiment, the performance of the model is estimated by evaluating the label assignment to each unlabeled datapoint by obtaining the set of features, the set of unlabeled datapoints, the training dataset, the model, and a tolerance value. The nearest neighbor point is computed for each unlabeled datapoint based on the set of features and the training dataset. Further, the decision boundary radius of the model is computed for the nearest neighbor point of each unlabeled datapoint based on the training dataset and the tolerance value using a Bayesian optimization technique. Then, a ground truth or a confidence score is assigned to each unlabeled datapoint based on a comparison of (i) the first distance (ii) the second distance and (iii) the decision boundary radius.

In another aspect, a method for estimating model performance based on model decision boundaries is provided. The method includes receiving a set of unlabeled datapoints as input and the set of unlabeled datapoints are provided into a model among a set of models to extract a set of features from a training dataset associated with the model. The performance of the model is estimated by evaluating a label assigned to each unlabeled datapoint from the set of unlabeled datapoints based on computing a nearest neighbor point of each unlabeled datapoint from the training dataset with a first distance and a second distance and an associated ground truth. The assignment of the label is performed if the location of each unlabeled datapoint lies within a decision boundary of the model around the nearest neighbor point.

In one embodiment, the performance of the model is estimated by evaluating the label assignment to each unlabeled datapoint by obtaining the set of features, the set of unlabeled datapoints, the training dataset, the model, and a tolerance value. The nearest neighbor point is computed for each unlabeled datapoint based on the set of features and the training dataset. Further, the decision boundary radius of the model is computed for the nearest neighbor point of each unlabeled datapoint based on the training dataset and the tolerance value using a Bayesian optimization technique. Then, a ground truth or a confidence score is assigned to each unlabeled datapoint based on a comparison of (i) the first distance (ii) the second distance and (iii) the decision boundary radius.

In yet another aspect, a non-transitory computer readable medium for receiving a set of unlabeled datapoints as input and the set of unlabeled datapoints are provided into a model among a set of models to extract a set of features from a training dataset associated with the model. The performance of the model is estimated by evaluating a label assigned to each unlabeled datapoint from the set of unlabeled datapoints based on computing a nearest neighbor point of each unlabeled datapoint from the training dataset with a first distance and a second distance and an associated ground truth. The assignment of the label is performed if the location of each unlabeled datapoint lies within a decision boundary of the model around the nearest neighbor point.

In one embodiment, the performance of the model is estimated by evaluating the label assignment to each unlabeled datapoint by obtaining the set of features, the set of unlabeled datapoints, the training dataset, the model, and a tolerance value. The nearest neighbor point is computed for each unlabeled datapoint based on the set of features and the training dataset. Further, the decision boundary radius of the model is computed for the nearest neighbor point of each unlabeled datapoint based on the training dataset and the tolerance value using a Bayesian optimization technique. Then, a ground truth or a confidence score is assigned to each unlabeled datapoint based on a comparison of (i) the first distance (ii) the second distance and (iii) the decision boundary radius.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
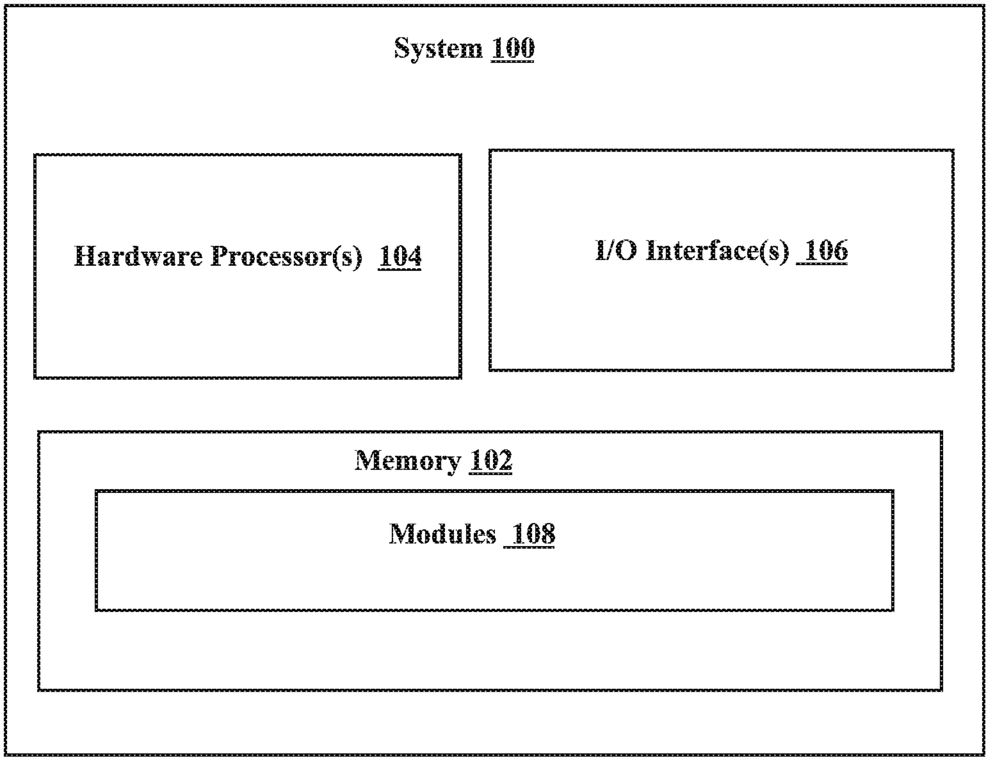
FIG. 1 illustrates an exemplary block diagram of a system to estimate model performance without ground truth, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments herein provide a method and system to estimate model performance without ground truth based on model decision boundaries. The method enables, to estimate a set of artificial intelligence models' health in an unlabeled datapoints environment for example, a machine learning model, a deep learning model and the like. The method estimates model performance for a set of unlabeled datapoints received as input which can be collated over time. The set of unlabeled datapoints are provided as input into a model from the set of models in batch and a nearest neighbor point is computed from a training data of the model. Further, for each unlabeled datapoint the method computes a model decision boundary. The decision boundary is hypersphere in higher dimensions with radius r such that any point within this distance r should have same ground truth as that of the nearest neighbor. Further, the method assigns a ground truth for each unlabeled datapoint to estimate the model performance. Additionally, the method of the present disclosure is not dependent on drift and can be used to estimate the model performance irrespective of the data drift. The disclosed system is further explained with the method as described in conjunction with FIG. 1 to FIG. 7 below.

Referring now to the drawings, and more particularly to FIG. 1 through FIG. 7, where similar reference characters denote corresponding features consistently throughout the figures, there are shown preferred embodiments, and these embodiments are described in the context of the following exemplary system and/or method.

FIG. 1 illustrates an exemplary block diagram of a system to estimate model performance without ground truth, in accordance with some embodiments of the present disclosure. In an embodiment, the batch processing system 100 includes processor (s) 104, communication interface (s), alternatively referred as or input/output (I/O) interface(s) 106, and one or more data storage devices or memory 102 operatively coupled to the processor (s) 104. The system 100, with the processor(s) is configured to execute functions of one or more functional blocks of the system 100.

Referring to the components of the system 100, in an embodiment, the processor (s) 104 can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. The memory 102 may comprise information pertaining to input(s)/output(s) of each step performed by the processor(s) 104 of the system 100 and methods of the present disclosure. Functions of the components of system 100, for predicting batch processes, are explained in conjunction with FIG. 2 and FIG. 3 providing flow diagram, architectural overviews, and performance analysis of the system 100.

Figure 2:
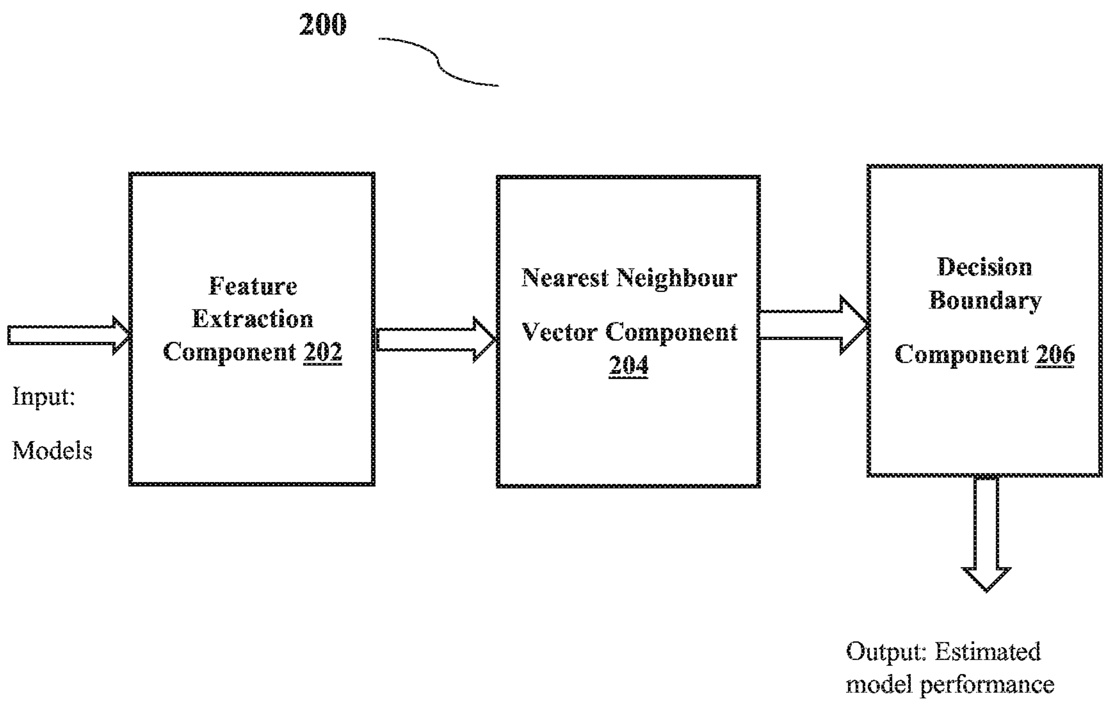
FIG. 2 is a functional block diagram of a processor-implemented method for estimating model performance without ground truth, in accordance with some embodiments of the present disclosure.

FIG. 2 is a functional block diagram of a method for estimating model performance without ground truth, in accordance with some embodiments of the present disclosure. FIG. 2 includes a feature extraction component 202, a nearest neighbor vector component 204 and a decision boundary component 206.

The feature extraction component 202 of the system 100 extracts a set of features from the received input comprising a set of unlabeled datapoints.

The nearest neighbor vector component 204 of the system 100 computes the nearest neighboring vector points for the set of unlabeled datapoints from the training data of the model based on any nearest neighbor algorithm known in the art for which the performance is being estimated. Here, the nearest neighbor algorithm may be an k-value nearest algorithm and the like.

The decision boundary component 206 of the system 100 computes the decision boundary of each unlabeled datapoint to assign ground truth by using a Bayesian optimization technique.

Figure 3:
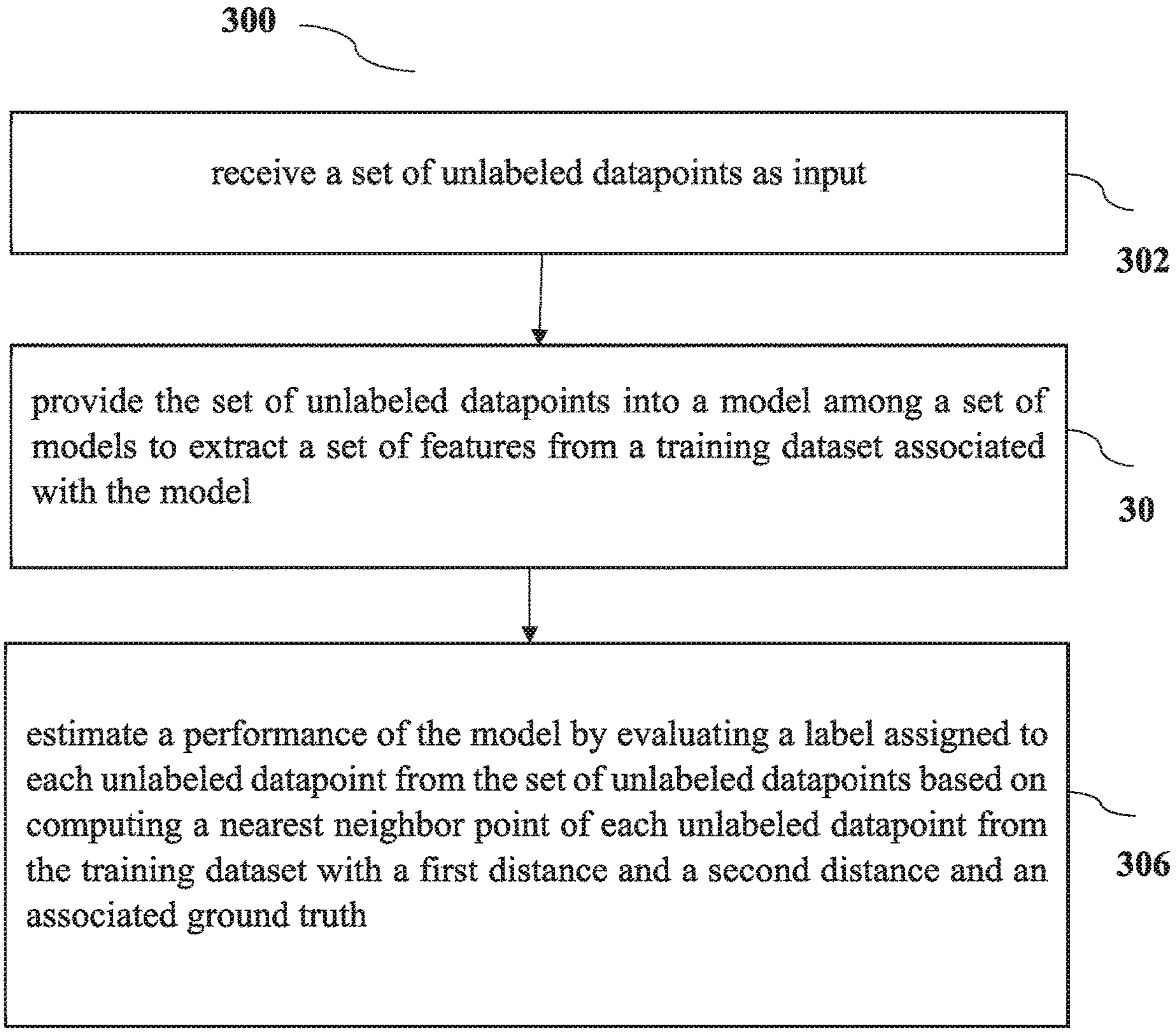
FIG. 3 illustrates an exemplary flow diagram of a processor-implemented method for estimating model performance without ground truth, in accordance with some embodiments of the present disclosure.

FIG. 3 illustrates an exemplary flow diagram of a processor-implemented method for estimating model performance without ground truth, in accordance with some embodiments of the present disclosure. In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIG. 1 through FIG. 2 and the steps of flow diagram as depicted in FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring now to the steps of the method 300, at step 302, the one or more hardware processors 104 receive a set of unlabeled datapoints as input. The system 100 receives the set of unlabeled datapoints as input from one or more users intended to estimate a model performance of a model without availability of ground truths. The inputs may be user specified inputs which can span across various domains and use cases.

At step 304 of the method 300, the one or more hardware processors 104 provide the set of unlabeled datapoints into at least one model amongst a set of models to extract a set of features from a training dataset associated with the at least one model.

The set of models includes at least one of a machine learning model, a deep learning model, and the like. Considering an example where a model M being one of the machine learning model, or the deep learning model and X is a batch of input unlabeled datapoints to estimate the model performance. Here, X represents the set of unlabeled datapoints assuming the true labels or ground truth for the batch X is not available. The vector $y_M$=M(X) represents the prediction for the batch X, which are either class labels or regression values, depending on the model M.

At step 306 of the method 300, the one or more hardware processors 104 estimate a performance of the model (or the at least one model) by evaluating a label assigned to each unlabeled datapoint from the set of unlabeled datapoints based on computing a nearest neighbor point of each unlabeled datapoint from the training dataset $X_{train}$ with a first distance and a second distance and an associated ground truth. The label is assigned if the location of each unlabeled datapoint lies within a decision boundary of the model around the nearest neighbor point. The method (referring now Table 1) obtains the set of features that are obtained from the feature extractor component 202, the set of unlabeled datapoints, the training dataset, the model, and a tolerance value.

TABLE 1

Model performance estimator

```
Input: Model M, input data X, tolerance ϵ,
Output: Model performance ( )
y_M = M(X)
count, y_E = estimate GT(M, X, ϵ);
   Input: Model M, input data X, Xtrain, tolerance ϵ
   Output: Ground truth: y_E
   Count = 0;
   for x∈X do
   Y = M(X);
   {d_x, x_n, y_n} = findNN(X, X_train);
   r_x = decisionBD(M, x_n, ϵ);
   if (d_x ≤ r_x)then
      y_xgt = y_n;
      y_E = y_E. append (y_xgt);
   end
   else
      count = count + 1;
      y_E = y_E. append (y);
   End
End
```

$$\text{Confidence score} = \frac{\text{count} * 100}{\text{size}\,(X)}$$

```
return {count, y_E};
if count ≤ δ then
   Outputp = evalperf (y_M, y_E, mode);
   return output;
end
   else
return 1
end
```

The nearest neighbor point for each unlabeled datapoint x∈X is computed based on the set of features and the training dataset $x_{train}$.

Then, the decision boundary radius $r_x$ of the model M is computed for the nearest neighbor point x of each unlabeled datapoint based on the training dataset and the tolerance value using a Bayesian optimization technique.

Further, a ground truth $y_n$ to x or a confidence score is assigned to each unlabeled datapoint based on a comparison of (i) the first distance, (ii) the second distance and (iii) the decision boundary radius. The first distance $d_x$ is computed from each unlabeled datapoint to the nearest neighbor point in the training dataset.

The second distance $d_x$ is computed from the nearest neighbor point to the decision boundary. The ground truth to each unlabeled datapoint if the first distance $d_x \leq r_x$ is lesser than the decision boundary radius.

The confidence score is assigned for each unlabeled datapoint if the first distance $d_x$ is greater $d_x \geq r_x$ than the second distance $d_x$ and the confidence score is computed based on a number of unlabeled datapoints as denoted in Equation 1.

$$\underset{x_p \in R^n}{\text{minimize}}\ r_x = \|x_n - x_p\|2 \qquad \text{Equation 1}$$

$$\text{subject to } M(x) \neq M(x_p)$$

The confidence score is computed based on a number of unlabeled datapoints. If the number of unlabeled datapoints exceeds a user-specified predefined threshold, then the estimate is unreliable. Further, depending on whether the selected mode is classification or regression, the respective performance metric, for example accuracy/F1 score or root mean square error (RMSE)/mean absolute error (MAE) and thereof) is computed with standard evaluation mechanism using assigned ground truths $y_E$ and predicted outputs $y_M$. The system 100 conjectures that if the input point x is within the model decision boundary of its nearest neighbor $x_n$ from the training data, then the ground truth is the $y_n$ of $x_n$ is the actual ground truth of x. The ground truth is assigned to each unlabeled datapoint if the first distance is lesser than the decision boundary radius.

Figure 4:
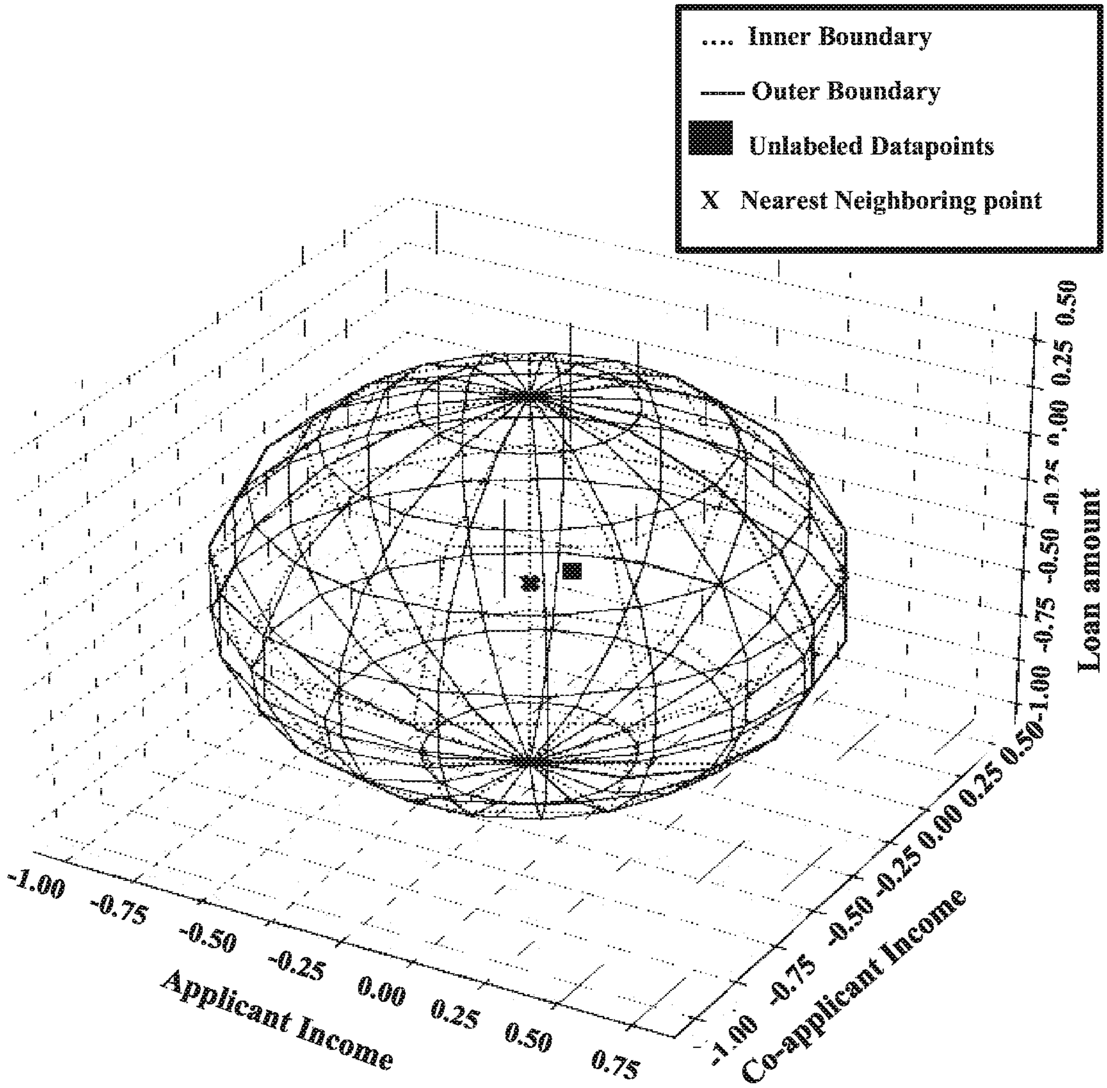
FIG. 4 illustrates a graphical representation of decision boundary in three-dimensional (3D) hypersphere enclosing a nearest neighboring point where an unlabeled datapoint lies inside the boundary of the hypersphere, in accordance with some embodiments of the present disclosure.

FIG. 4 illustrates a graphical representation of decision boundary in three-dimensional (3D) hypersphere enclosing a nearest neighboring point where an unlabeled datapoint lies inside the boundary of the hypersphere, in accordance with some embodiments of the present disclosure. FIG. 4 denotes the decision boundary in the three-dimensional plane which is a hypersphere in $R^n$ with center at $x_n$ and radius $r_x$ and can be computed by solving the optimization problem. The three-dimensional (3D) plane where the bases are formed is utilized to extract the set of features to make a coordinate transformation from cartesian to spherical polar coordinates of the following Equation 2, $$x = r \sin\theta \cos\phi,\ y = r \sin\theta \cos\phi,\ z = r \cos\theta \qquad \text{Equation 2}$$

If $x_p$::{x_p, y_p, z_p} denotes the unlabeled datapoints and $DB_n$:{x_n, y_n, z_n} denotes the nearest neighboring point, then the decision boundary should lie between $r_1$ and $r_2$ as denoted in Equation 3, $$r_1 = \sqrt{\min\left(\sum_{i=x,y,z} (x_{pi} - x_{ni})^2\right)} \text{ and } r_1 = \sqrt{\max\left(\sum_{i=x,y,z} (x_{pi} - x_{ni})^2\right)} \qquad \text{Equation 3}$$

The inner boundary corresponds to a sphere of radius $r_1$, while the outer boundary corresponds to the sphere with radius $r_2$. If the new unlabeled datapoint lies within the region bounded by the two spheres, then the decision is influenced by the nearest neighbor point and the label of the unlabeled datapoint is assigned to be the label of the nearest neighbor point. If the new unlabeled datapoint lies outside the region bounded by the two spheres, then the decision is not influenced by the nearest neighbor point and the label of the unlabeled datapoints is assigned to be opposite to the label of the nearest neighbor point.

Figure 5:
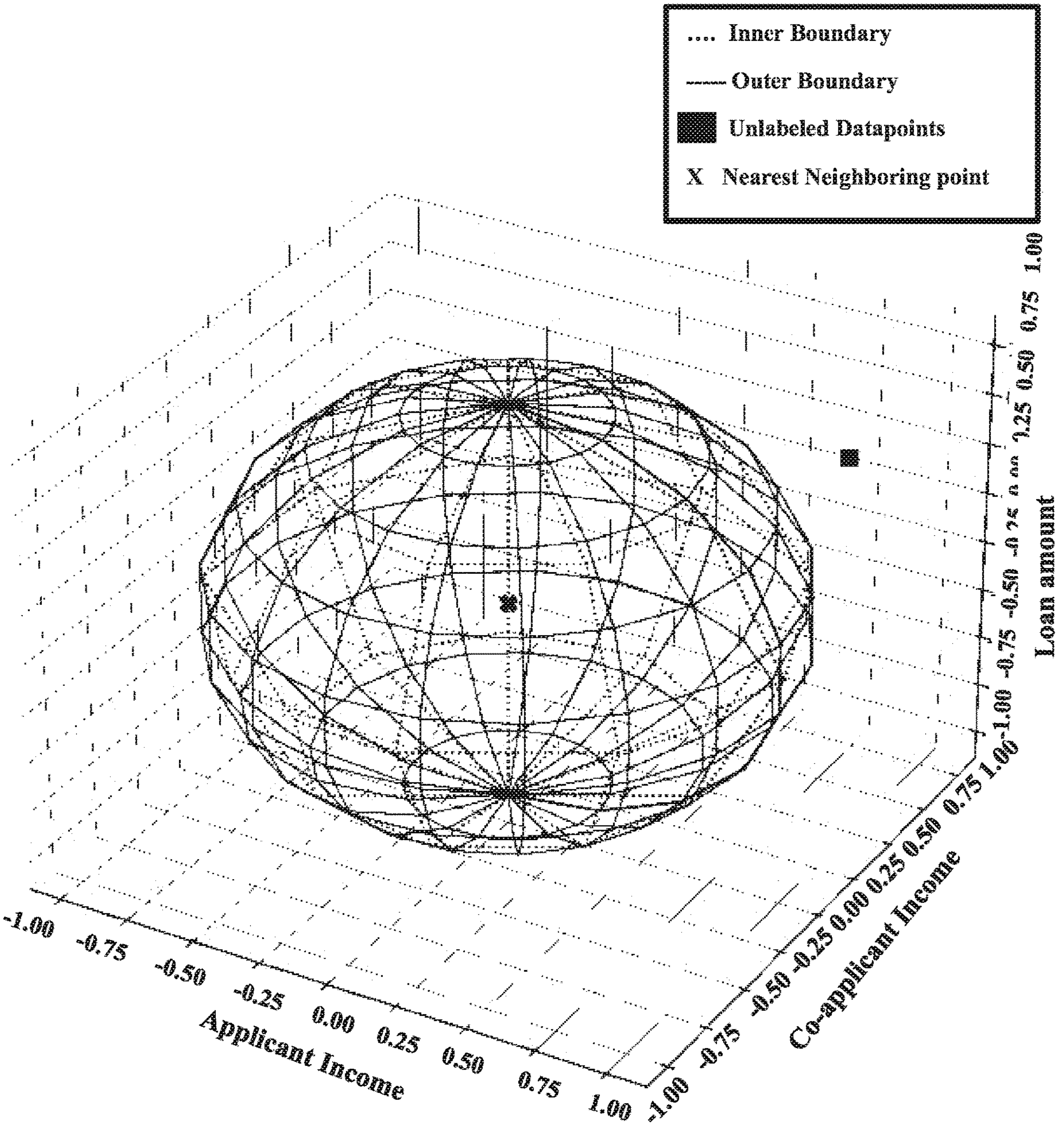
FIG. 5 illustrates a graphical representation of decision boundary in three-dimensional (3D) hypersphere where the ground truth differs from model predictions and the unlabeled datapoint lies outside the boundary of the hypersphere, in accordance with some embodiments of the present disclosure.
Figure 6:
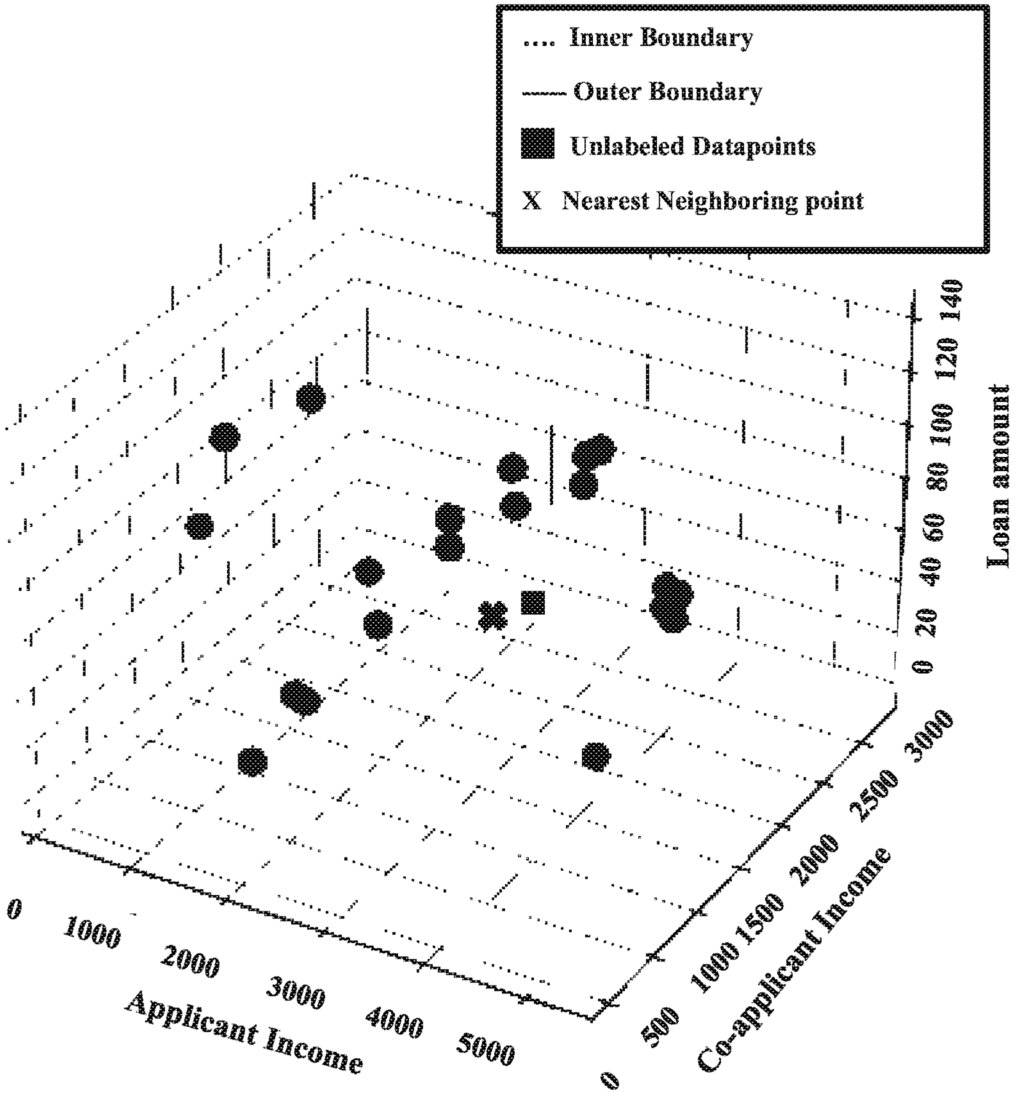
FIG. 6 illustrates a graphical representation of decision boundary in three-dimensional (3D) space cartesian coordinates enclosing the nearest neighboring point where an unlabeled datapoint lies inside the boundary, in accordance with some embodiments of the present disclosure.
Figure 7:
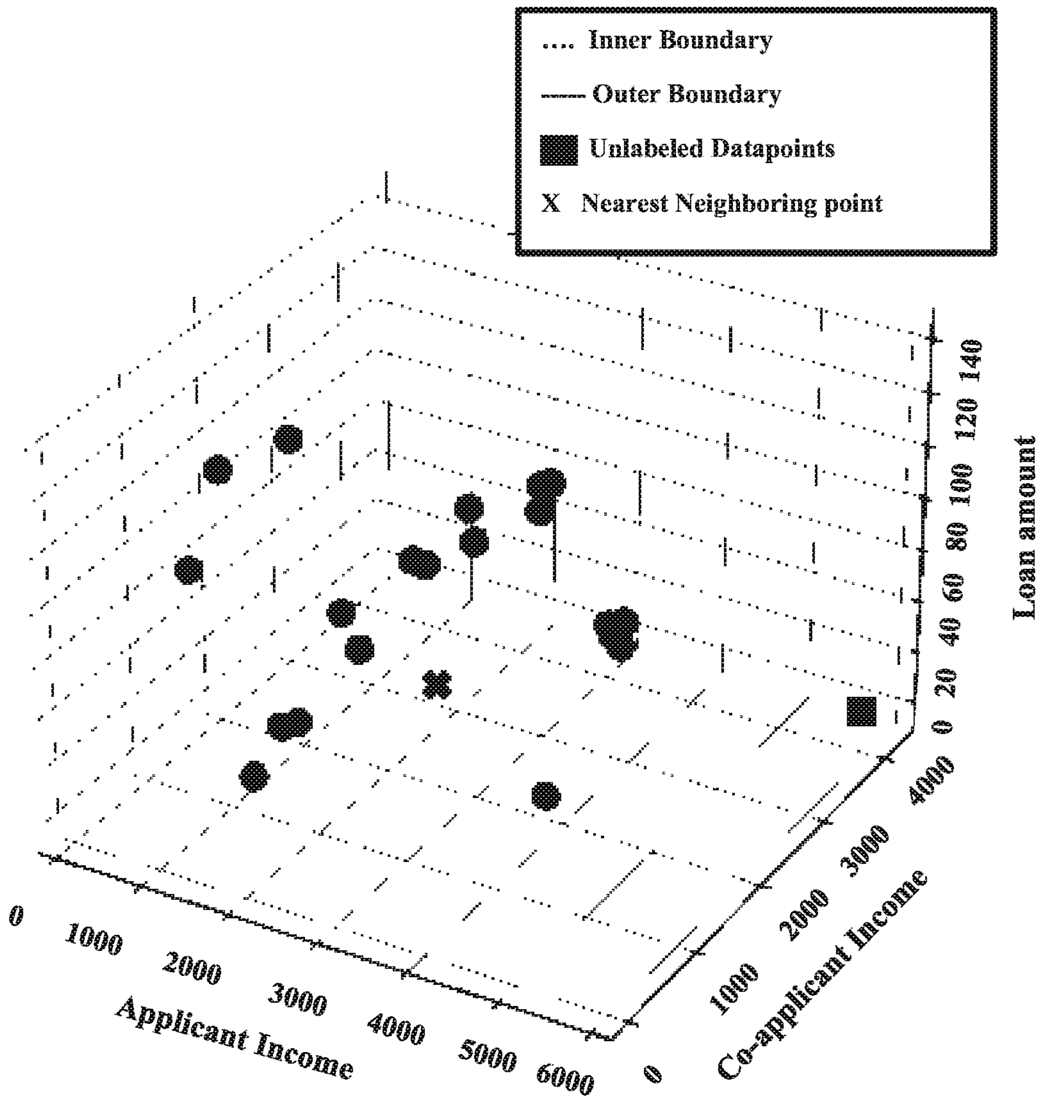
FIG. 7 illustrates a graphical representation of decision boundary in three-dimensional (3D) space cartesian coordinates enclosing the nearest neighboring point where an unlabeled datapoint lies outside the boundary, in accordance with some embodiments of the present disclosure.

FIG. 5 illustrates a graphical representation of decision boundary in three-dimensional (3D) hypersphere where the ground truth differs from model predictions and the unlabeled datapoint lies outside the boundary of the hypersphere, in accordance with some embodiments of the present disclosure. In one embodiment, considering a use case scenario of loan predict where 12 attributes out of which 5 are categorical and the remaining are numerical. The label is represented by two classes. Here, the model was trained using a Random Forest Classifier model. The data was more or less balanced with the two classes constituting around 68% and 32% of the entire data, and "Accuracy" was chosen as the model performance metric. Depending on the imbalance ratio, one can choose a different metric. Further, 70% of the data was used for training and rest 20% for validation and remaining 10% for unlabeled datapoints. Referring now to FIG. 6, the model was trained on the training data and used as reference model. For each unlabeled datapoint, the nearest neighbor point is determined from the training dataset, constructed a decision boundary, and identified using the Bayesian optimization. Subsequently the first distance and the second distance (referring now to FIG. 7) of the unlabeled datapoint are computed from the decision boundary and the nearest neighboring point and the label of the unlabeled datapoint is estimated depending on whether the point lies within the boundary.

The system and method of the present disclosure considered a use case scenario for credit card fraud detection, in which there were 16 input features and out of 16 there were 5 categorical columns and the rest being numerical columns. The label is represented by two classes. The model was trained using XGBoost model. The actual distribution of the classes in the test data was highly imbalanced. Hence, the metric chosen for this case was average precession. Nevertheless, the experiments were carried for multiple imbalance ratios between different classes to account for the robustness. Further, 70% of the data was used for training and rest 20% for validation and remaining 10% for unlabeled datapoints. Similar to the loan predictor use case, here also the model was trained on the training data and used as reference model. Like the previous use case, the initial step involved identification of the nearest neighboring point to a given unlabeled datapoint and subsequent construction a decision boundary and followed by computing the distances of the unlabeled point from the decision boundary and the nearest neighboring point and estimated the label of the unlabeled point.

The system and method of the present disclosure considered another use case scenario of determining wine quality in which there were 11 input features, and all were numerical columns. The label is represented by two classes. Here, Random Forest model is utilized. The preprocessing steps involved getting rid of the missing values, standardizing the features using StandardScaler. "Accuracy" was chosen as the model performance metric. Here, 70% of the data for training and rest 20% for validation and remaining 10% for unlabeled datapoints.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiment of present disclosure herein addresses unresolved problem of performance estimation. The embodiment thus provides method and system to estimate model performance without ground truth based on model decision boundaries. Moreover, the embodiments herein further provide a method to estimate the relationship between model performance, decision boundary and ground truth for the unlabeled datapoints in an efficiently. Here, for each unlabeled data point in the batch, a nearest neighbor from the training data is computed and then the model decision boundary for that point is computed. The method of the present disclosure is not dependent on drift, hence can be used to estimate model performance irrespective of the data drifts.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for estimating model performance based on model decision boundaries, comprising:

receiving via one or more hardware processors, a set of unlabeled datapoints as input from one or more users intended to estimate model performance of a model without availability of ground truths;

providing via the one or more hardware processors, the set of unlabeled datapoints into a model among a set of models to extract a set of features from a training dataset associated with the model;

estimating via the one or more hardware processors, performance of the model by evaluating a label assigned to each unlabeled datapoint from the set of unlabeled datapoints based on computing a nearest neighbor point of each unlabeled datapoint from the training dataset with a first distance and a second distance and an associated ground truth, wherein the assignment of the label is performed if the location of each unlabeled datapoint lies within a decision boundary of the model around the nearest neighbor point, wherein a decision boundary radius of the model is computed for the nearest neighbor point of each unlabeled datapoint based on the training dataset and a tolerance value using a Bayesian optimization technique, wherein the decision boundary of the model is hypersphere in higher dimensions with decision boundary radius that any point within this decision boundary radius has same ground truth as that of the nearest neighbor, wherein the first distance is computed from each unlabeled datapoint to the nearest neighbor point in the training dataset, the second distance is computed from the nearest neighbor point to the decision boundary and wherein the ground truth is assigned to each unlabeled datapoint if the first distance is lesser than the decision boundary radius; and assigning a confidence score to each unlabeled datapoint based on a comparison of (i) the first distance, (ii) the second distance and (iii) the decision boundary radius, wherein the confidence score is assigned for each unlabeled datapoint if the first distance is greater than the second distance and the confidence score is computed based on a number of unlabeled datapoints, wherein when the number of unlabeled datapoints exceeds a user-specified predefined threshold, the estimate is unreliable.

2. The processor implemented method as claimed in claim 1, wherein the set of models includes at least one of a machine learning model, and a deep learning model.

3. A system 100 for estimating model performance based on model decision boundaries comprising:

a memory (102) storing instructions;

one or more communication interfaces (106); and one or more hardware processors (104) coupled to the memory via the one or more communication interfaces (106), wherein the one or more hardware processors (104) are configured by the instructions to:

receive a set of unlabeled datapoints as input from one or more users intended to estimate model performance of a model without availability of ground truths;

provide the set of unlabeled datapoints into a model among a set of models to extract a set of features from a training dataset associated with the model;

estimate a performance of the model by evaluating a label assigned to each unlabeled datapoint from the set of unlabeled datapoints based on computing a nearest neighbor point of each unlabeled datapoint from the training dataset with a first distance and a second distance and an associated ground truth, wherein the assignment of the label is performed if the location of each unlabeled datapoint lies within a decision boundary of the model around the nearest neighbor point, wherein a decision boundary radius of the model is computed for the nearest neighbor point of each unlabeled datapoint based on the training dataset and a tolerance value using a Bayesian optimization technique, wherein the decision boundary of the model is hypersphere in higher dimensions with decision boundary radius that any point within this decision boundary radius has same ground truth as that of the nearest neighbor, wherein the first distance is computed from each unlabeled datapoint to the nearest neighbor point in the training dataset, the second distance is computed from the nearest neighbor point to the decision boundary and wherein the ground truth is assigned to each unlabeled datapoint if the first distance is lesser than the decision boundary radius; and assign a confidence score to each unlabeled datapoint based on a comparison of (i) the first distance, (ii) the second distance and (iii) the decision boundary radius, wherein the confidence score is assigned for each unlabeled datapoint if the first distance is greater than the second distance and the confidence score is computed based on a number of unlabeled datapoints, wherein when the number of unlabeled datapoints exceeds a user-specified predefined threshold, the estimate is unreliable.

4. The system as claimed in claim 3, wherein the set of models includes at least one of a machine learning model, and a deep learning model.

5. One or more non-transitory machine-readable information storage mediums comprising one or more instructions which when executed by one or more hardware processors cause:

receiving a set of unlabeled datapoints as input from one or more users intended to estimate model performance of a model without availability of ground truths;

providing the set of unlabeled datapoints into a model among a set of models to extract a set of features from a training dataset associated with the model;

estimating a performance of the model by evaluating a label assigned to each unlabeled datapoint from the set of unlabeled datapoints based on computing a nearest neighbor point of each unlabeled datapoint from the training dataset with a first distance and a second distance and an associated ground truth, wherein the assignment of the label is performed if the location of each unlabeled datapoint lies within a decision boundary of the model around the nearest neighbor point, wherein a decision boundary radius of the model is computed for the nearest neighbor point of each unlabeled datapoint based on the training dataset and a tolerance value using a Bayesian optimization technique, wherein the decision boundary of the model is hypersphere in higher dimensions with decision boundary radius that any point within this decision boundary radius has same ground truth as that of the nearest neighbor, wherein the first distance is computed from each unlabeled datapoint to the nearest neighbor point in the training dataset, the second distance is computed from the nearest neighbor point to the decision boundary and wherein the ground truth is assigned to each unlabeled datapoint if the first distance is lesser than the decision boundary radius; and assigning a confidence score to each unlabeled datapoint based on a comparison of (i) the first distance, (ii) the second distance and (iii) the decision boundary radius, wherein the confidence score is assigned for each unlabeled datapoint if the first distance is greater than the second distance and the confidence score is computed based on a number of unlabeled datapoints, wherein when the number of unlabeled datapoints exceeds a user-specified predefined threshold, the estimate is unreliable.

* * * * *